United States Patent [19]

Bredfeldt et al.

[11] 4,090,782
[45] May 23, 1978

[54] ELECTROCHROMIC DISPLAY DEVICES COMPRISING THIENYLIDENE PYRAZOLINE COMPOUNDS

[75] Inventors: Karin Else Bredfeldt; Robert Bruce Champ; Karl John Fowler, all of San Jose, Calif.

[73] Assignee: International Business Machines Corporation, Armonk, N.Y.

[21] Appl. No.: 801,946

[22] Filed: May 31, 1977

[51] Int. Cl.$^2$ .................. G02F 1/17; G09K 3/00; G02F 1/20; G02B 5/23
[52] U.S. Cl. ................................. 350/357; 542/453
[58] Field of Search ............... 260/240 E, 240 TC; 252/408 R, 500, 501; 350/160 R; 96/1.5, 1.6

[56] References Cited

U.S. PATENT DOCUMENTS

| | | | |
|---|---|---|---|
| 3,180,729 | 4/1965 | Klupfel et al. | 96/1.5 |
| 3,451,741 | 6/1969 | Manos | 350/160 R |
| 3,806,229 | 4/1974 | Schoot et al. | 252/408 |
| 3,824,099 | 7/1974 | Champ et al. | 96/1.5 |
| 3,837,851 | 9/1974 | Shattuck et al. | 96/1.5 |
| 3,854,794 | 12/1974 | Van Dam et al. | 350/160 R |
| 3,957,352 | 5/1976 | Leibowitz | 350/160 R |
| 4,018,508 | 4/1977 | Mc Dermott et al. | 350/160 R |

OTHER PUBLICATIONS

Seki, H., IBM Tech. Discl. Bull., vol. 19, No. 2, pp. 653–654 (July 1976).
Pragst, V. F. et al., Journal F. Prakt. Chemie, vol. 316, No. 2, pp. 267–285 (1974).
Pragst, V. F., Journal F. Prakt. Chemie, vol. 315, No. 3, pp. 549–564 (1970).
Kaufman, F. B., et al., IBM Tech. Discl. Bull., vol. 20, No. 5, pp. 2001–2004 (Oct. 1977).

*Primary Examiner*—Benjamin R. Padgett
*Assistant Examiner*—T. S. Gron
*Attorney, Agent, or Firm*—Joseph G. Walsh

[57] ABSTRACT

This invention relates to a reversible display device based upon the electrochromic properties of certain thienylidene pyrazoline compounds when used in conjunction with a complementary redox material.

6 Claims, No Drawings

ELECTROCHROMIC DISPLAY DEVICES COMPRISING THIENYLIDENE PYRAZOLINE COMPOUNDS

Field of the Invention

The present invention is concerned with a reversible display device which utilizes the electrochromic effect obtained using certain thienylidene pyrazoline compounds with complementary redox materials. The thienylidene pyrazoline compounds useful in the present invention are those having the formula

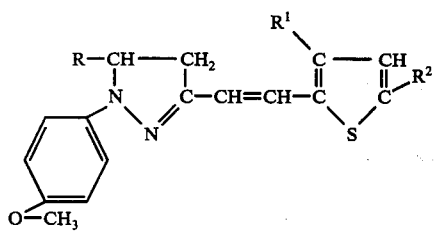

wherein R equals aryl or aromatic hetero ring and each of $R^1$ and $R^2$ is hydrogen or lower alkyl.

Prior Art

Electrochromic display devices of several types are known in the prior art. As far as we are aware, however, the prior art does not teach the use of the compounds diclosed in the present invention.

Triaryl pyrazoline compounds for use in reversible electrochromic display devices are taught in U.S. Pat. application, Ser. No. 754,303 filed Dec. 27, 1976, inventors Shattuck and Sincerbox. That application, however, contains no disclosure of the thienylidene compounds used in the present invention.

The display devices obtained according to the present invention have the particular advantage over the prior art in having greater electrochromic efficiencies.

SUMMARY OF THE INVENTION

According to the present invention, an electrochemical reaction is used to form a color absorbing species. This color forming process is utilized as a display device by containing the reactive medium between electrically conductive electrodes, at least one of which must be transparent. In such a configuration, information is selectively displayed by segmenting the electrodes into a suitable pattern and applying a potential across the proper electrodes to produce coloration in the desired areas.

In the present invention, the electrochromic coloration reaction takes place due to the oxidation of the thienylidene pyrazoline compound at the anode and simultaneous reduction of a suitable redox material at the cathode. The thienylidene pyrazoline compound has the formula described above. The useful complementary redox materials are electron acceptors and include such compounds as, for example, phenylhydroquinone, fluorenones, fluorenes, carbazoles which are polynitro substituted, and benzene compounds substituted with electron withdrawing groups. The electron acceptor compound serves as a complementary material in an oxidation/reduction process with the thienylidene pyrazoline. In that oxidation/reduction reaction, the thienylidene pyrazoline compound is oxidized, while the electron acceptor material is reduced, thereby tending to balance the display cell electrochemically. This electrochemical balance results in good reversibility of cell operation. Still another advantage is a reduction of electrode degradation. Increased color change may also be obtained due to color produced by the reduced form of the complementary redox material, in addition to the oxidized thienylidene pyrazoline. Erasure of the image is obtained in a symmetrical cell by short-circuiting the cell or by momentary application of the reverse polarity potential.

As is known to the prior art, the electrochromic reaction is carried out in an anhydrous solvent. Useful solvents include, for example, methyl ethyl ketone, N,N-dimethylformamide, dimethylsulfoxide, N,N-dimethylacetamide, tetrahydrofuran, and acetonitrile.

The thienylidene pyrazoline compounds of the present invention are those having the formula

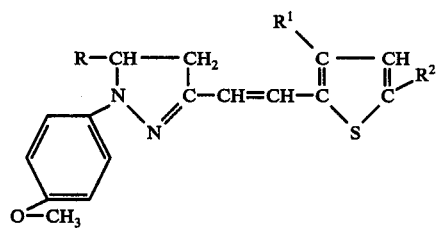

wherein R equals aryl or aromatic hetero ring and each of $R^1$ and $R^2$ is hydrogen or lower alkyl.

As examples of compounds having the above formula which have been found particularly useful in the present invention mention is made of 1-p-anisyl-3-[2-(3-methyl-2-thienyl) vinyl]-5-p-diethylamino phenyl Δ-2-pyrazoline; 1-p-anisyl-3-[2-(5-methyl-2-thienyl)-vinyl]-5-p-diethylamino phenyl Δ-2-pyrazoline; 1-p-anisyl-3-[2-(3-methyl-2-thienyl)-vinyl]-5-[3-methyl-2-thienyl] Δ-2-pyrazoline; 1-p-anisyl-3-[2-(3-methyl-2-thienyl)-vinyl]-5-phenyl Δ-2-pyrazoline; and 1-p-anisyl-3-[2-(2-thienyl)-vinyl]-5-[2-thienyl] Δ-2-pyrazoline.

Particular attention also should be called to the requirement of a phenyl group with a methoxy substituent in the para position. Only when the molecules have this particular configuration are the very great efficiencies of the present invention obtained. The theoretical explanation for this is not understood.

The following Examples are given solely for purposes of illustration and are not to be considered limitations on the invention, many variations of which are possible without departing from the spirit or scope thereof.

EXAMPLE I

A solution is made up of
0.1 molar phenyl-p-benzoquinone;
0.1 molar

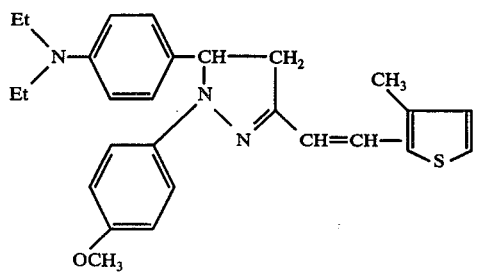 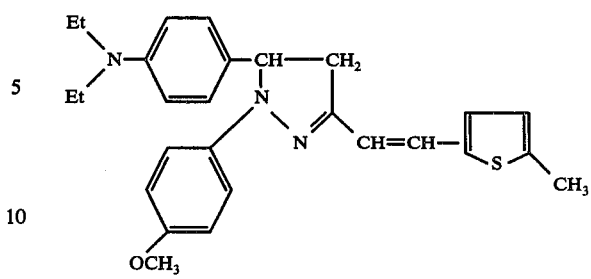

and 0.4 molar Tetrabutylammonium tetrafluoborate in methyl ethyl ketone.

The above solution is placed between two transparent In$_2$O$_3$ electrodes 5 mils apart and a potential is applied across the cell. A color change from yellow to brownish-black is observed and when the potential is removed the color returns to the yellow state.

EXAMPLE II

Example 1 is repeated using
0.8 molar tetrabutyl ammonium tetrafluoborate instead of 0.4 molar and using the solvent system methyl ethyl ketone/acetonitrile/ethanol in a 3 to 1 to 1 ratio.

Again the solution is placed between two transparent In$_2$O$_3$ electrodes with 5 mil spacing and a potential of about 2 volts is placed across the cell. The optical density is measured by a photopic probe apparatus which simulates the sensitivity of the human eye (5500 A peak sensitivity). The current across the cell is measured for a known length of time. Thereby, one can compute the milli coulombs/cm$^2$ passed through the cell to give a certain optical density. This optical density per milli coulombs per centimeter squared is termed the efficiency of the cell. In this example, the efficiency is 0.291 OD/MC/cm$^2$.

EXAMPLE III

The following solution is prepared by dissolving the solid ingredients in a 3:1:1 solvent system of methyl ethyl ketone/acetonitrile/ethanol.

The solids are: .1 molar and
0.1 molar p-nitrobenzonitrile,
and
0.8 molar Tetrabutylammonium tetrafluorborate The material is tested as in the previous Example and an efficiency of 0.322 OD/MC/cm$^2$ is obtained.

EXAMPLE IV

Example III is repeated using a solvent system of methyl ethyl ketone/ethanol in a 4:1 ratio and substituting phenyl-p-benzoquinone for p-nitrobenzonitrile. Efficiency is 0.297 OD/MC/cm$^2$.

EXAMPLE V

The following solution is prepared:
0.17 molar

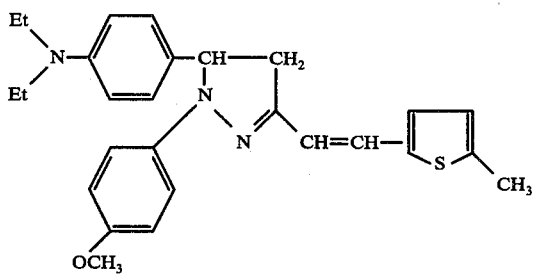

0.3 molar phenyl-p-benzoquinone, and
0.4 molar tetrabutylammonium perchlorate in methyl ethyl ketone. When tested as shown in Example II an efficiency of 0.287 OD/MC/cm$^2$ is obtained.

EXAMPLE VI

Two electrochromic solutions were prepared for a comparative test in order to show the improved efficiency of a compound of the present invention, when compared to a related compound not having a thienylidene group.

| Solution A | Solution B |
|---|---|
| 0.15 molar<br />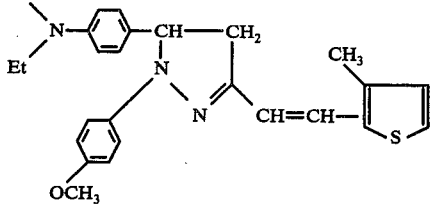<br />.06 molar phenyl-p-benzoquinone<br />.13 molar tetraethylammonium tetrafluoborate<br />-N,N-dimethylacetamide | .15 molar<br />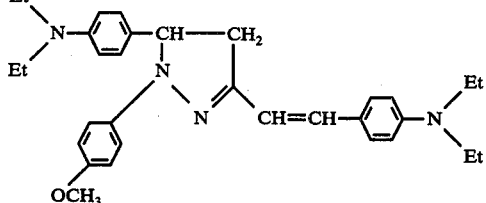<br />.06 molar phenyl-p-benzoquinone<br />.13 molar tetraethylammonium tetrafluoborate<br />-N,N-dimethylacetamide |

| Solution A | Solution B |
|---|---|
| Efficiency: 0.299 OD/MC/cm$^2$ | .252 OD/MC/cm$^2$ |

EXAMPLE VII

A solution was prepared using the following materials:

0.15 molar

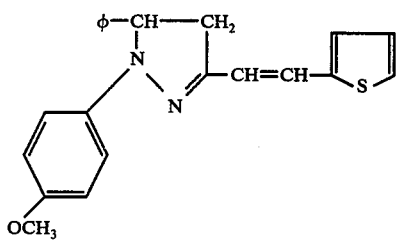

0.06 molar phenyl-p-benzoquinone
0.13 molar tetraethylammonium tetrafluoborate dimethylacetamide
Efficiency as measured in the previous Examples is 0.209 OD/MC/cm$^2$.

EXAMPLE VIII

The following two solutions are prepared varying only in pyrazoline compound.

0.158 molar

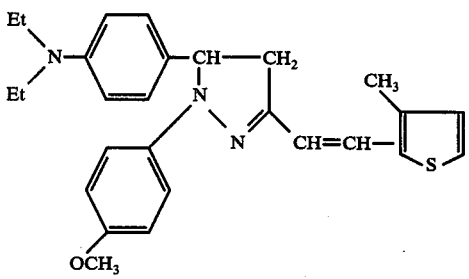

0.25 molar p-nitrobenzonitrile
1.2 molar tetrabutyl ammonium tetrafluoborate in methyl ethyl ketone.
The following parameters were measured.

| OD/V slope | 0.55 |
|---|---|
| Threshold voltage | 1.24 |
| Ave. Efficiency | .72 OD/MC/cm$^2$ |
| Pulse Time | 2 milliseconds |
| OD at 2.0 V | 0.41 |
| Electrode spacing | 1.5 mils |

| A. | B. |
|---|---|
| 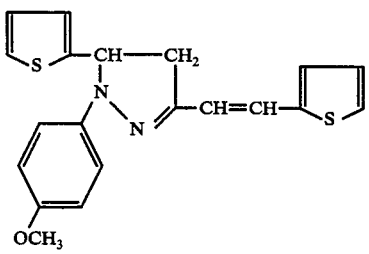 | 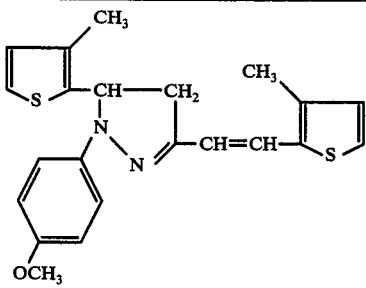 |
| 0.2 grams | 0.2 grams |

0.2 grams tetraethylammonium tetrafluoborate
0.1 grams p-nitrobenzonitrile in N-methyl pyrrolidone.

| Optical Density | 0.46 | 0.44 |
|---|---|---|
| Voltage on Circuit | 6 V | 6 V |
| Time on | 88 msec | 68 msec |
| Color | Black | Black |
| Efficiency | 0.18 OD/MC/cm$^2$ | .22 OD/MC/cm$^2$ |

EXAMPLE IX

The following formulation was tested for various electrochromic parameters.

EXAMPLE X

Using the procedure described above, the following compounds were measured for electrochromium efficiency. These tests show the very great advantage of having a methoxy group in the compound.

| Structure | Efficiency | |
|---|---|---|
| 1. 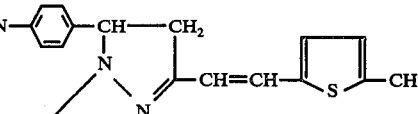 | X = H | .05 OD/NC/cm² |
|  | X = CH₃ | .3 OD/MC/cm² |
| 2.  | X = H | .03 OD/MC/cm² |
|  | X = OCH₃ | .18 OD/MC/cm² |
| 3. 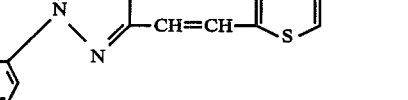 | X = H | .05 OD/MC/cm² |
|  | X = OCH₃ | .29 OD/MC/cm² |

EXAMPLE XI

A typical synthesis of thienylidene pyrazolines is outlined below.

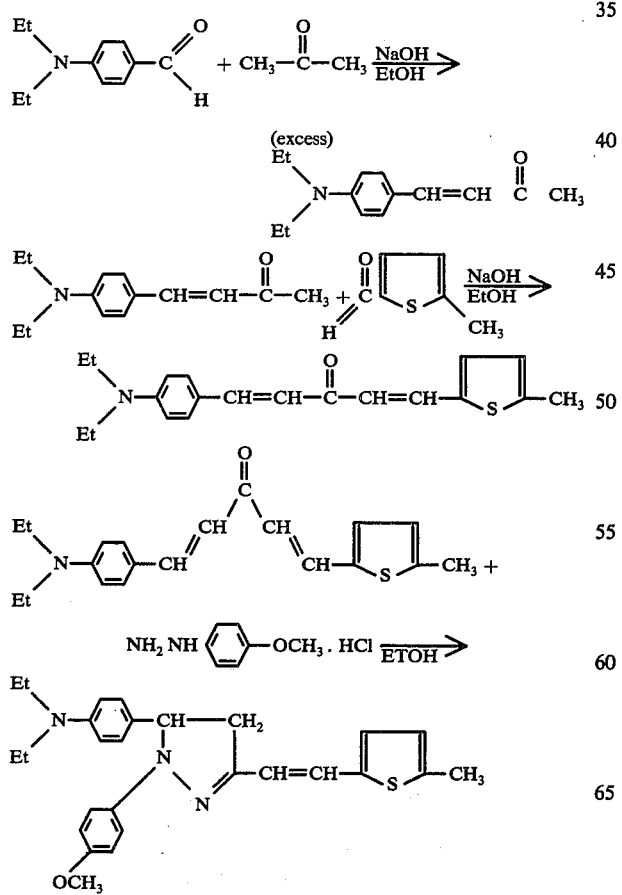

What is claimed is:

1. A reversible electrochromic display device comprising a reactive medium between two electrically conductive electrodes, at least one of which is transparent, said medium comprising an anhydrous solvent and an oxidant/reductant pair in which the reductant is an electron acceptor and the oxidant is a thienylidene pyrazoline compound having the formula

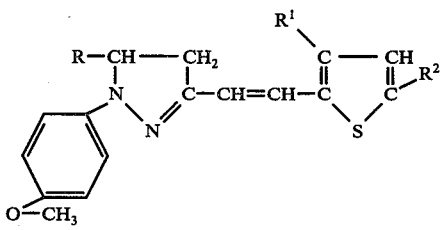

wherein R equals a phenyl or thienyl ring which may be substituted with an electron releasing group and each of R¹ and R² is hydrogen or lower alkyl.

2. A device as claimed in claim 1 wherein the oxidant is 1-p-anisyl-3-[2-(3-methyl-2-thienyl)-vinyl]-5-p-diethylamino phenyl Δ-2-pyrazoline.

3. A device as claimed in claim 1 wherein the oxidant is 1-p-anisyl-3-[2-(5-methyl-2-thienyl)-vinyl]-5-p-diethylamino phenyl Δ-2-pyrazoline.

4. A device as claimed in claim 1 wherein the oxidant is 1-p-anisyl-3-[2-(3-methyl-2-2-thienyl)-vinyl]-5-[3-methyl-2-thienyl] Δ-2-pyrazoline.

5. A device as claimed in claim 1 wherein the oxidant is 1-p-anisyl-3-[2-(3-methyl-2-thienyl)-vinyl]-5-phenyl Δ-2-pyrazoline.

6. A device as claimed in claim 1 wherein the oxidant is 1-p-anisyl-3-[2-(2-thienyl)-vinyl]-5-[2-thienyl] Δ-2-pyrazoline.

* * * * *